(12) United States Patent
Law

(10) Patent No.: US 6,273,941 B1
(45) Date of Patent: Aug. 14, 2001

(54) DESICCANT PACKAGE HAVING A CONTROLLABLE PERMEATION RATE FOR HIGH RELIABILITY APPLICATIONS

(75) Inventor: Henry Hon Law, Berkeley Heights, NJ (US)

(73) Assignee: TyCom (US) Inc., Morristown, NJ (US)

( * ) Notice: Subject to any disclaimer, the term of this patent is extended or adjusted under 35 U.S.C. 154(b) by 0 days.

(21) Appl. No.: 09/204,042

(22) Filed: Dec. 1, 1998

(51) Int. Cl.[7] .............................. B01D 53/02; B01D 53/26
(52) U.S. Cl. ...................................... 96/4; 96/108; 96/134; 96/138
(58) Field of Search ............................ 96/133, 138, 147, 96/148, 151, 4, 134, 108; 95/117

(56) References Cited

U.S. PATENT DOCUMENTS

| | | | |
|---|---|---|---|
| 4,146,277 | * | 3/1979 | Santoro ................................. 96/148 |
| 4,783,206 | * | 11/1988 | Cullen et al. .......................... 96/134 |
| 5,230,719 | * | 7/1993 | Berner et al. .......................... 96/148 |
| 5,718,743 | * | 2/1998 | Donnelly et al. ...................... 96/147 |
| 5,788,064 | * | 8/1998 | Sacherer et al. ...................... 206/204 |
| 5,893,945 | * | 4/1999 | Hunsinger et al. .................... 96/147 |
| 5,897,691 | * | 4/1999 | Hunsinger et al. .................... 96/147 |

FOREIGN PATENT DOCUMENTS

95/25045   *   9/1995   (GB).

* cited by examiner

Primary Examiner—David A. Simmons
Assistant Examiner—Robert A. Hopkins

(57) ABSTRACT

A desiccant package is provided that includes a housing having at least one opening. A desiccant material is located in the housing. A sealing element, which is secured over the opening, includes a water-permeable membrane. The sealing element reduces the rate at which moisture enters the desiccant container and prevents fine particles from escaping from the package.

13 Claims, 3 Drawing Sheets

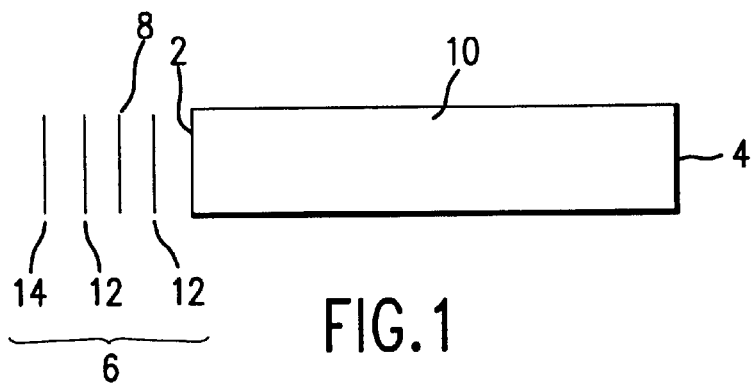

FIG.1

| PERMEABILITY OF POLYMER FILMS TO WATER VAPOR (25°C)[2] ||
| FILM | $P=(cm^3$ AT STP$)(mm \times 10^2)/(cm^2 s)/(cm$ Hg$)$ |
| --- | --- |
| POLY(VINYLIDENE CHLORIDE) (SARAN) | 0.3–1.0 |
| POLYTETRAFLUOROETHYLENE (TEFLON) | 0.3 |
| BUTYL RUBBER | 1.3 |
| POLYETHYLENE (DENSITY 0.960) | 1.2 |
| POLYETHYLENE (DENSITY 0.938) | 2.5 |
| POLYETHTLENE (DENSITY 0.922) | 9 |
| POLYPROPYLENE (DENSITY 0.907) | 5.1 |
| POLY(VINYL CHLORIDE) | 6.1 |
| POLY(VINYL CHLORIDE-VINYL ACETATE) | 7 |
| POLY(ETHYLENE TEREPHTHALATE (MYLAR) | 13 |
| POLYSTYRENE | 12 |
| POLYACRYLONITRILE | 13 |
| POLYBUTADIENE | 47 |
| POLY(STYRENE-BUTADIENE) | 9 |
| POLY(BUTADIENE-ACRYLONITRILE (62%)) | 15 |
| POLYISOPRENE (NATURAL RUBBER) | 30 |
| POLYAMIDE (NYLO 66)(95% RELATIVE HUMIDITY) | 68 |
| CELLULOSE ACETATE | 550 |
| CELLULOSE ACETATE (15% DIBUTYL PHTHALATE) | 740 |
| ETHYL CELLULOSE, PLASTICISED | 1300 |
| POLY(VINYL ALCOHOL), p=2.3cm Hg | 4200 |

FIG.2

DESICCANT PACKAGE HAVING A CONTROLLABLE PERMEATION RATE FOR HIGH RELIABILITY APPLICATIONS

FIELD OF THE INVENTION

The invention relates generally to desiccant packages, and more particularly to a desiccant package that may be used in a high reliability environment for extended periods of time such as an optical fiber splice box used in undersea transmission systems.

BACKGROUND OF THE INVENTION

Desiccants are commonly employed to maintain the moisture content of a closed system at a low level. Desiccant materials such as silica gel and molecular sieve, for example, have a large surface area for adsorbing moisture. However, conventional desiccant packagings may not be suitable for high reliability applications that require a clean environment. For example, one problem with conventional desiccant materials is that they can release fine particles, which can contaminate the clean environment.

Another problem arises when the closed system is to be operational for an extended period of time (e.g., one or more decades) without being available for maintenance. In such situations the capacity of the desiccant should not be exhausted during the operational life of the system since there is no opportunity to replace the desiccant material. The rate at which the desiccant capacity is exhausted is of particular concern when the closed system must undergo an assembly process that can last for hours or even days. While the system is exposed to the larger environment during assembly, and hence more moisture will be able to reach the desiccant in a shorter period of time, prematurely exhausting the desiccant capacity even before the system is closed. Common desiccant materials absorb water rapidly in an open environment, approximately 50% of their capacity in one or two hours.

An example of a closed system of the previously mentioned type is a splice box, which is employed in undersea optical communication systems. One type of splice box serves as a housing for securing cable connectors such as cable-to-cable connectors and cable-to-repeater connectors. Since undersea cables require electrical continuity across their spans and thus across connectors, the splice box must be appropriately insulated. For this reason the splice box undergoes an overmolding process to encase it in polyethylene during its final assembly. The splice box is designed to function undersea for twenty-five or more years without requiring service.

Some splice boxes house additional components such as a gain equalization filter (GEF), for example. This filter is used to adjust the gain among the various optical channels after they undergo amplification in the repeater. To avoid corrosion of the filter, the moisture content of the splice box needs to be maintained at or below a relative humidity of 50%. Since the splice box does not provide a hermetic seal that prevents moisture from entering, the GEF splice box requires a desiccant.

Accordingly, there is need for a desiccant that does not release fine particles or dust and which has a substantially reduced moisture adsorption rate.

SUMMARY OF THE INVENTION

In accordance with the present invention, a desiccant package is provided that includes a housing having at least one opening. A desiccant material is located in the housing. A sealing element, which is secured over the opening, includes a water-permeable membrane. The sealing element advantageously reduces the rate at which moisture enters the desiccant container and prevents fine particles from escaping from the package. By reducing the rate at which moisture enters the container, the amount of moisture adsorbed during assembly of the splice box is reduced, thus preserving the desiccant's capacity for undersea use.

In one particular embodiment of the invention, the water-permeable membrane is fabricated from polyethylene terephthalate and has a thickness, for example, of between 3 and 6 microns. The housing may advantageously have a cylindrical shape and the opening is located on one end of the cylinder.

The sealing element may include first and second wire mesh elements, with the membrane being located therebetween. At least one O-ring is employed for sealing the sealing element is the opening. A retaining ring is located on an outer surface of the sealing element for securing the sealing element in the opening.

BRIEF DESCRIPTION OF THE DRAWINGS

FIG. 1 shows an embodiment of a desiccant package constructed in accordance with the principles of the present invention.

FIG. 2 shows the permeability of various polymer films to water vapor at 25 degrees Celsius.

DETAILED DESCRIPTION

FIG. 1 shows an embodiment of a desiccant package constructed in accordance with the principles of the present invention. The package includes a cylindrical shaped housing 10 fabricated from a nonporous material such as aluminum, stainless steel or plastic. The particular shape and materials of the housing are application specific and the configuration shown in FIG. 1 is not to be construed as a limitation on the invention. The housing contains the desiccant material for adsorbing moisture. Any desiccant material may be used, including but not limited to, silica gel and molecular sieve.

Moisture enters the housing through the two opposing planar end surfaces 2 and 4 of the housing 10. The end surfaces 2 and 4 are each covered by a sealing element 6.

In accordance with the present invention, the sealing element 6 includes a water-permeable membrane 8 that reduces the rate at which moisture enters the desiccant container and prevents fine particles from escaping from the container. Since the diffusion rate of water through the membrane depends on the membrane material and thickness, the choice of material dictates the rate at which reaches the desiccant material. The diffusion rate of materials for a particular gas or vapor is measured in terms of its permeability.

FIG. 2 shows the permeability of various polymer films to water vapor at 25 degrees Celsius. The water-permeable membrane 8 may selected from among these materials. As shown, the permeability constant of these materials extends over three orders of magnitude, thus offering a wide range of choices that can be determined based on the application.

Among the materials listed in FIG. 2, a particularly suitable material from which the membrane 8 may be fabricated is polyethylene terephthalate, also known as MYLAR. MYLAR is an attractive choice for use in a desiccant employed in a splice box because the splice box is raised to a temperature of 140° C. during the overmolding process and MYLAR can withstand such a high temperature. Moreover, MYLAR is resistant to tearing, thus enhancing its reliability.

Figure 3:
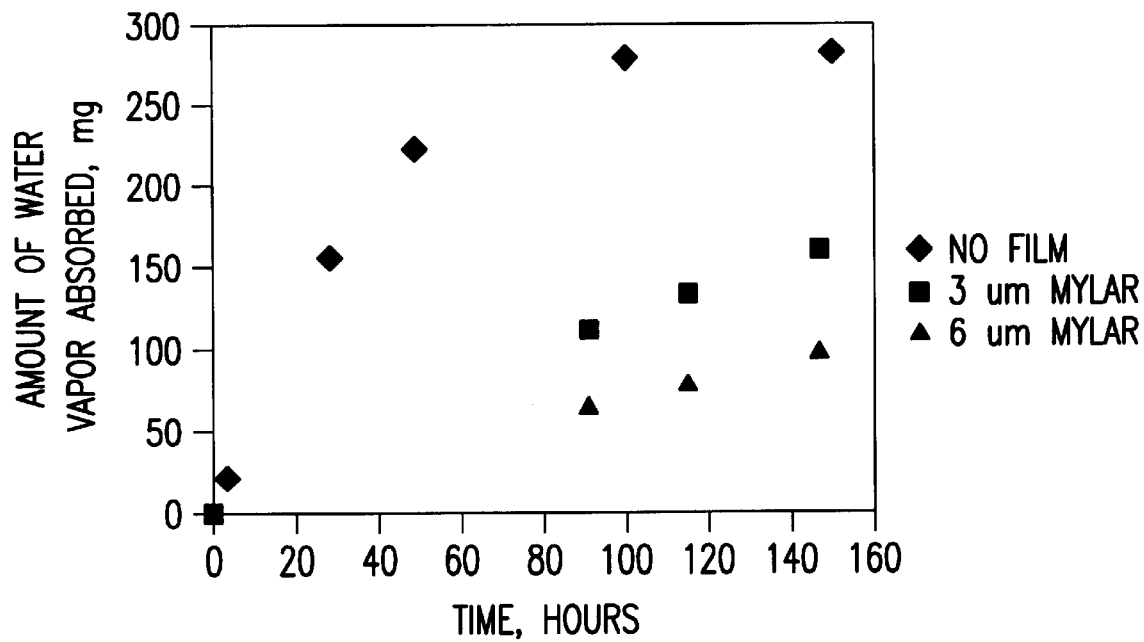
FIG. 3 shows the rate of permeation of water vapor through two Mylar films 3 microns and 6 microns thick.

FIG. 3 shows the rate of permeation of water vapor through two MYLAR films 3 microns and 6 microns thick. The data was obtained by the conventional weighted-cell method at a temperature of 30° C. and 75% relative humidity. A dried desiccant package containing silica gel was placed inside a glass bottle which was capped tightly with the polymeric film, which had an exposed area of about 3.8 cm$^2$. The bottle was hung above distilled water containing excess sodium chloride inside a canning jar. The sealed jar was placed inside a temperature controlled oven maintained at 30° C. By monitoring the weight change of the bottle containing the desiccant, the rate of water adsorption was measured in a straightforward manner.

Although the weighted-cell method for experimentally determining water vapor permeability is simple, it is subject to errors, including the possibility of an additional diffusion barrier arising from stagnant air layers inside the cell. It is important to demonstrate that no significant barrier was present that could distort the data.

As seen in FIG. 3, the initial permeation rates (at <50% adsorption capacity) of the package without film, with the 3 micron film, and with the 6 micron film are, respectively, 5.3, 1.2, and 0.7 mg/hr. The permeation rate without any MYLAR film is at least four times greater than those with the films. No significant diffusion barrier error was evident. The permeation rate of the 3 micron film was close to double the rate for the 6 micron film, indicating that the primary rate-limiting step was the permeation through the MYLAR film.

Returning to FIG. 1, the sealing element 6 includes the membrane 8 and a series of other elements that support the membrane over the end surfaces 2 and provide a seal to prevent moisture and other particles from entering or exiting the housing 10 without passing through the membrane 8. More specifically, the membrane is sandwiched between two wire mesh elements 12. An O-ring (not shown) is located about the inner surface of end surfaces 2 and 4. The seal is established when the mesh 12 is pressed against the O-ring. A retaining ring 14 located on the side of the mesh 12 remote from the O-ring secures the sealing element 6 in the end surfaces 2 and 4 of the housing 10.

Based on the data shown in FIG. 3, the membrane advantageously may be a MYLAR film. The thickness of the film will depend on the rate of permeation that is desired for a given application, but from on the above analysis a thickness of 3–6 microns generally should be sufficient. The initial permeation rates for a desiccant container sealed with a MYLAR sheet three microns and six microns thick are approximately 0.4% and 0.24% of the adsorption capacity/hour, respectively. For the desiccant container without the MYLAR the initial permeation rate is about 1.9%. Accordingly, the MYLAR film creates a diffusion barrier that reduces the water adsorption rate by about four to eight times. The MYLAR also effectively prevents fine particles exceeding about 0.5 microns from escaping from the desiccant housing, thus avoiding contamination to the closed system (e.g., a GEF splice box) in which the desiccant is employed.

Figure 4:
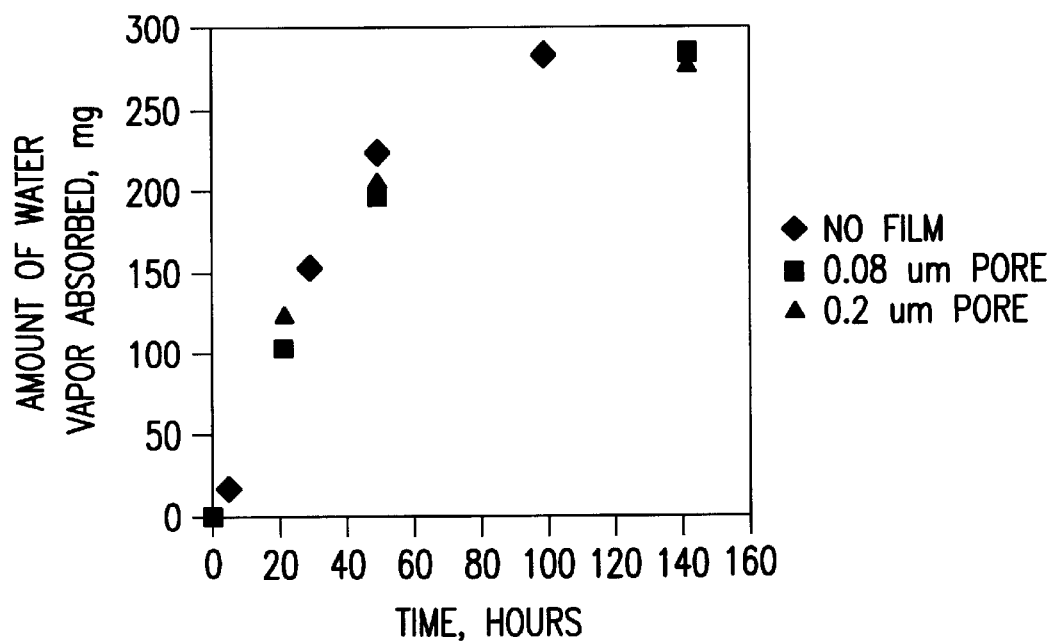
FIG. 4 shows the permeation of water vapor through polycarbonate membranes having pores sizes of 0.08 and 0.22 microns.

For certain applications it may be desirable to increase the water adsorption rate over that obtained with a MYLAR film. For example, polycarbonate films having small pores can provide an increased water permeation rate and yet limit the release of particles. FIG. 4 shows the permeation of water vapor through polycarbonate membranes having pores sizes of 0.08 and 0.22 microns. FIG. 4 also shows the permeation of water vapor through the desiccant container without any membrane. As shown, the permeation rates are all similar to one another and have a value of about 5.3 mg/hour when the adsorption capacity is below 50%.

Figure 5:
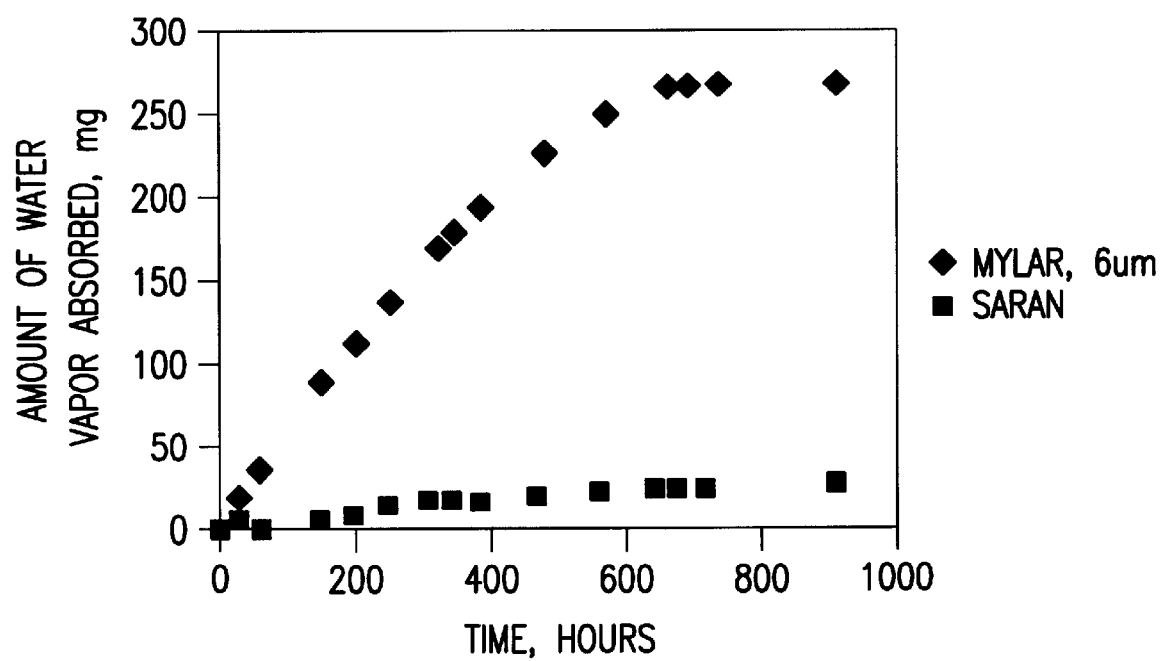
FIG. 5 shows the permeation rate of water vapor for Saran film and for Mylar 6 microns thick.

In applications that require a permeation rate lower than that provided by MYLAR film, a polymer may be selected from FIG. 2 that has a permeation rate below that of MYLAR. For example, polyvinylidene chloride, known by the tradename SARAN Wrap, has a permeability of about 0.3–1.0. FIG. 5 shows the permeation rate of water vapor for SARAN film and for MYLAR 6 microns thick. The permeation rate for the SARAN film is 0.036 mg/hr, or about twenty times less than the MYLAR film.

What is claimed is:

1. A desiccant package comprising:
   a housing having at least one opening;
   a desiccant material located in said housing; and
   a sealing element secured over said at least one opening, said sealing element having a particular thickness and including a water-permeable membrane such that said particular thickness gives rise to a desired permeation rate for water vapor, said sealing element having a first and second wire mesh elements, wherein said membrane being located between said first and second wire mesh elements, at least one O-ring for sealing said sealing element in said opening, a retaining ring located on an outer surface of said sealing element for securing said sealing element in said opening.

2. The desiccant of claim 1 wherein said membrane is polyethylene terephthalate.

3. The desiccant of claim 2 wherein said membrane has a thickness of between 3 and 6 microns.

4. The desiccant of claim 1 wherein said housing has a cylindrical shape.

5. The desiccant of claim 4 wherein said at least one opening is located on one end of said cylinder.

6. The desiccant of claim 4 wherein said housing has first and second openings on opposing ends of said cylinder and further comprising a second sealing element secured over said second opening.

7. A desiccant package, comprising:
   a housing having at least one opening;
   a desiccant material located in said housing; and
   means for allowing moisture to be conducted through said opening at a prescribed rate while preventing particles larger than about 0.5 microns from being conducted through said opening, said conduction means including a first and second wire mesh elements wherein said membrane is disposed therebetween, an O-ring for sealing said sealing element in said opening, and a retaining ring located on an outer surface of said sealing element for securing said sealing element in said opening.

8. The desiccant of claim 7 wherein said conduction means includes a polyethylene terephthalate membrane.

9. The desiccant of claim 8 wherein said membrane has a thickness of between 3 and 6 microns.

10. The desiccant of claim 7 wherein said housing has a cylindrical shape.

11. The desiccant of claim 10 wherein said at least one opening is located on one end of said cylinder.

12. The desiccant of claim 10 wherein said housing has first and second openings on opposing ends of said cylinder and further comprising a second sealing element secured over said second opening.

13. The desiccant of claim 8 wherein said membrane has a selected thickness that gives rise to a desired permeation rate for water vapor.

\* \* \* \* \*